(No Model.)
P. HAUERSPERGER.
CHURN.
No. 340,115. Patented Apr. 20, 1886.
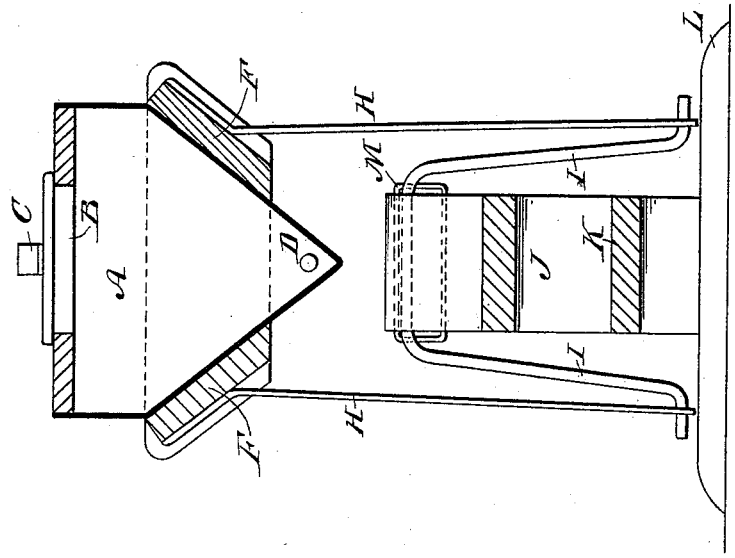
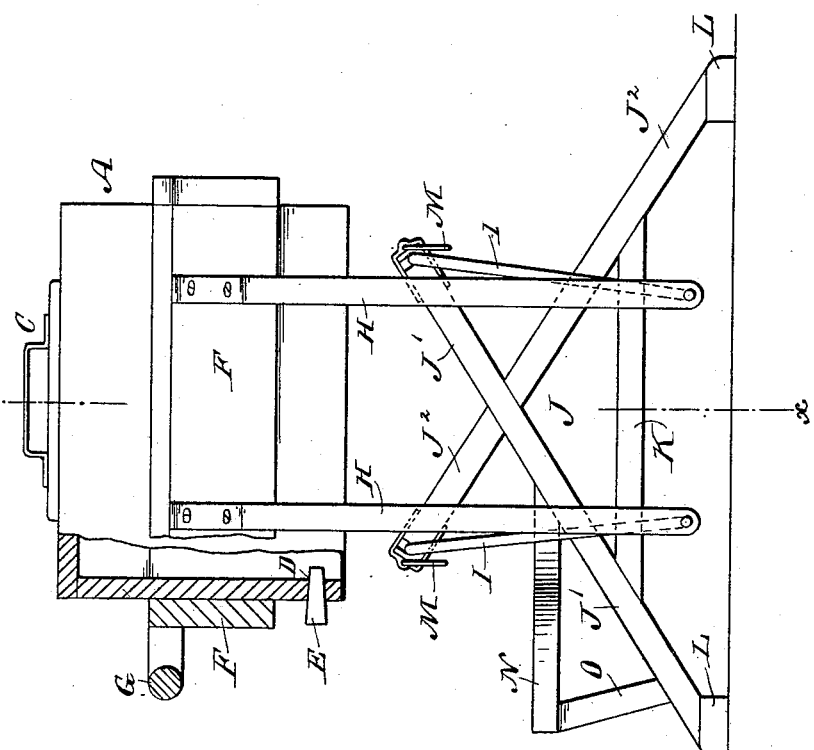
WITNESSES:
INVENTOR:
P. Hauersperger
BY Munn & Co.
ATTORNEYS.

United States Patent Office.

PETER HAUERSPERGER, OF URBANA, ILLINOIS.

CHURN.

SPECIFICATION forming part of Letters Patent No. 340,115, dated April 20, 1886.

Application filed June 16, 1885. Serial No. 168,878. (No model.)

*To all whom it may concern:*

Be it known that I, PETER HAUERSPERGER, of Urbana, in the county of Champaign and State of Illinois, have invented a new and Improved Churn, of which the following is a full, clear, and exact description.

The object of my invention is to provide a new and improved oscillating churn, in which either a very small quantity of cream or a larger amount may be churned with equal facility.

The invention consists in the peculiar construction and arrangement of parts, as hereinafter fully described, and pointed out in the claims.

Reference is to be had to the accompanying drawings, forming part of this specification, in which similar letters of reference indicate corresponding parts in both figures.

Figure 1 is a side elevation of my improved churn, parts being broken away and parts being shown in section. Fig. 2 is a cross-section of the same on the line $x \, x$ of Fig. 1.

A indicates a cream-box of a churn, which is rectangular in horizontal cross-section, and which is formed with a wedge-shaped bottom, as shown in Fig. 2.

The box A is provided on top with a rectangular aperture, B, through which the cream is poured into the box, and by means of which the butter is removed when the process of churning is completed. A cover, C, provided with a suitable handle, fits snugly into the aperture B and prevents any splashing or loss of cream during the oscillation of the churn. The box A is further provided with a small aperture, D, near the apex of one of the wedge-shaped end pieces, through which the butter-milk may be drawn off when all the butter has been separated. The aperture D is closed by a stopper, E.

The cream-box A is supported by a surrounding frame, F, whose side pieces incline inwardly and downwardly to conform to the wedge-shaped bottom of the box, and one of whose end pieces—that above the aperture and stopper D and E—is provided with a handle, G, which is used in oscillating the churn. The frame F in its turn is supported by four bars, H, which have their upper ends bent outwardly to conform to the side pieces of the frame, to which they are rigidly attached. The lower ends of the supporting-bars H are pivoted to the lower ends of four inclined rods or bars, I, the upper ends of which are pivoted to a main frame or standard, J. The said standard J is formed of two cross-pieces, J' and J², which are braced below their point of intersection by a connecting-bar, K. Each of the said pieces is provided at its lower end with a cross-rest or foot, L, and at its upper end with a handle, M, for convenience in transportation.

A platform, N, is supported from the cross-piece J' by means of an inclined brace, O, the said platform being intended to hold a crock or other suitable vessel for receiving the buttermilk from the aperture D.

The operation of the churn is very simple and convenient. By means of the handle G an oscillating motion is communicated to the frame F, and consequently to its contained cream-box A, by which the cream is thrown violently from one end of the box to the other and the butter soon separated.

The wedge-shaped bottom of the cream-box permits a very small quantity of cream to be churned with as much ease and thoroughness as a much larger amount.

The churn and its parts may be constructed of wood, metal, or other suitable material.

Having thus described my invention, what I claim as new, and desire to secure by Letters Patent, is—

1. In an oscillating churn, the combination, with the cream-box A and frame F, of the series of bars H, supporting the same, and the corresponding series of rods, I, pivoted at their lower ends to the said bars, and at their upper ends to the cross-pieces J' and J² of the main standard J, substantially as shown and described.

2. In an oscillating churn, the combination, with the cream-box A, having a wedge-shaped bottom and an aperture in its end, of a frame, F, surrounding the same, and provided with the handle G, a series of supporting-bars, H, attached to the frame, and a series of suspending-rods, I, pivoted at their lower ends to said bars, and at their upper ends to the cross-pieces J' and J² of the standard J, substantially as shown and described.

3. In an oscillating churn, the combination, with the cream-box A, having a wedge-shaped bottom and apertures B and D, of a frame, F, surrounding the box, provided with handle G, a series of supporting-bars, H, a series of suspending-rods, I, and the standard J, formed of the cross-pieces J' and J², the cross-rests or feet L, the handles M, and the platform N, substantially as shown and described.

PETER HAUERSPERGER.

Witnesses:
S. B. RADEBAUGH,
JOHN KINNY.